US012579678B2

(12) United States Patent
Tonouchi

(10) Patent No.: US 12,579,678 B2
(45) Date of Patent: Mar. 17, 2026

(54) INFORMATION PROCESSING DEVICE, INFORMATION PROCESSING METHOD, AND COMPUTER PROGRAM PRODUCT

(71) Applicant: KABUSHIKI KAISHA TOSHIBA, Tokyo (JP)

(72) Inventor: Yojiro Tonouchi, Inagi (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 397 days.

(21) Appl. No.: 18/170,803

(22) Filed: Feb. 17, 2023

(65) Prior Publication Data

US 2023/0410347 A1 Dec. 21, 2023

(30) Foreign Application Priority Data

Jun. 21, 2022 (JP) ................................. 2022-099709

(51) Int. Cl.
*G06T 7/70* (2017.01)
*G06F 3/16* (2006.01)
(Continued)

(52) U.S. Cl.
CPC .................. *G06T 7/70* (2017.01); *G06F 3/16* (2013.01); *G06T 3/40* (2013.01); *G06T 5/50* (2013.01); *G06V 10/25* (2022.01); *G06V 10/26* (2022.01); *G06T 2207/20221* (2013.01); *G06V 2201/07* (2022.01)

(58) Field of Classification Search
CPC .... G06T 7/70; G06T 3/40; G06T 5/50; G06T 2207/20221; G06F 3/16; G06F 3/167; G06V 10/25; G06V 10/26; G06V 2201/07; G06V 40/103; G06V 10/82; G06V 20/52
See application file for complete search history.

(56) References Cited

U.S. PATENT DOCUMENTS

| | | | | |
|---|---|---|---|---|
| 10,070,047 | B2 * | 9/2018 | Adachi | .................. H04N 7/181 |
| 10,249,055 | B2 * | 4/2019 | Adachi | .................. G06T 7/254 |
| 2009/0244635 | A1 * | 10/2009 | Mizuno | .............. H04N 1/00005 |
| | | | | 715/838 |
| 2013/0259310 | A1 * | 10/2013 | Tsukamoto | ............... G06T 3/40 |
| | | | | 382/103 |

(Continued)

FOREIGN PATENT DOCUMENTS

| | | |
|---|---|---|
| JP | 2005-003852 A | 1/2005 |
| JP | 2008-136024 A | 6/2008 |

(Continued)

OTHER PUBLICATIONS

Japanese Office Action issued on Jun. 3, 2025 in Japanese Patent Application No. 2022-099709 (with unedited computer-generated English translation), 6 pages.

(Continued)

*Primary Examiner* — Stephen R Koziol
*Assistant Examiner* — Joshua Chen
(74) *Attorney, Agent, or Firm* — Oblon, McClelland, Maier & Neustadt, L.L.P.

(57) ABSTRACT

According to an embodiment, an information processing device includes a specific target area detection unit, a captured area detection unit, and a determination unit. The specific target area detection unit detects a specific target area of a specific target from a taken image. The captured area detection unit detects a captured area of the specific target from the taken image. The determination unit determines a non-captured area of the specific target, based on the specific target area and the captured area.

11 Claims, 9 Drawing Sheets

(51) Int. Cl.
| | |
|---|---|
| *G06T 3/40* | (2024.01) |
| *G06T 5/50* | (2006.01) |
| *G06V 10/25* | (2022.01) |
| *G06V 10/26* | (2022.01) |
| *G06V 10/82* | (2022.01) |

(56) References Cited

U.S. PATENT DOCUMENTS

| | | | |
|---|---|---|---|
| 2014/0233851 A1* | 8/2014 | Kasuya | G06T 3/40 |
| | | | 382/165 |
| 2017/0310884 A1 | 10/2017 | Li | |
| 2020/0184968 A1* | 6/2020 | Han | G06N 20/00 |
| 2022/0036056 A1 | 2/2022 | Sato et al. | |
| 2022/0113918 A1* | 4/2022 | Judd | G06F 13/00 |
| 2023/0360405 A1* | 11/2023 | Itsumi | G06V 20/52 |
| 2025/0166222 A1* | 5/2025 | Sato | G06N 3/02 |

FOREIGN PATENT DOCUMENTS

| | | |
|---|---|---|
| JP | 2009-246545 A | 10/2009 |
| WO | WO 2020/217812 A1 | 10/2020 |

OTHER PUBLICATIONS

Japanese Decision to Grant a Patent in Application No. 2022-099709, with English translation issued Oct. 14, 2025.

* cited by examiner 30A (30)

P 34A (34)

C 30B (30)

P 34B (34)

INFORMATION PROCESSING DEVICE, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2022-099709, filed on Jun. 21, 2022; the entire contents of which are incorporated herein by reference.

FIELD

Embodiments described herein relate generally to an information processing device, an information processing method, and a computer program product.

BACKGROUND

A technique for detecting an object included in a taken image has been disclosed. For example, a technique for detecting a part of an object included in a taken image, and distinguishing the presence of an undetected part among a plurality of the parts that form the object has been disclosed.

However, in the conventional technique, the presence of an undetected part is merely distinguished, and it has been difficult to assist in imaging such that the entire specific target area such as a specific part of the object is captured.

DETAILED DESCRIPTION

According to an embodiment, an information processing device includes a specific target area detection unit, a captured area detection unit, and a determination unit. The specific target area detection unit detects a specific target area of a specific target from a taken image. The captured area detection unit detects a captured area of the specific target from the taken image. The determination unit determines a non-captured area of the specific target, based on the specific target area and the captured area.

Hereinafter, an information processing device, an information processing method, and a computer program product will be described in detail with reference to the accompanying drawings.

Figure 1:
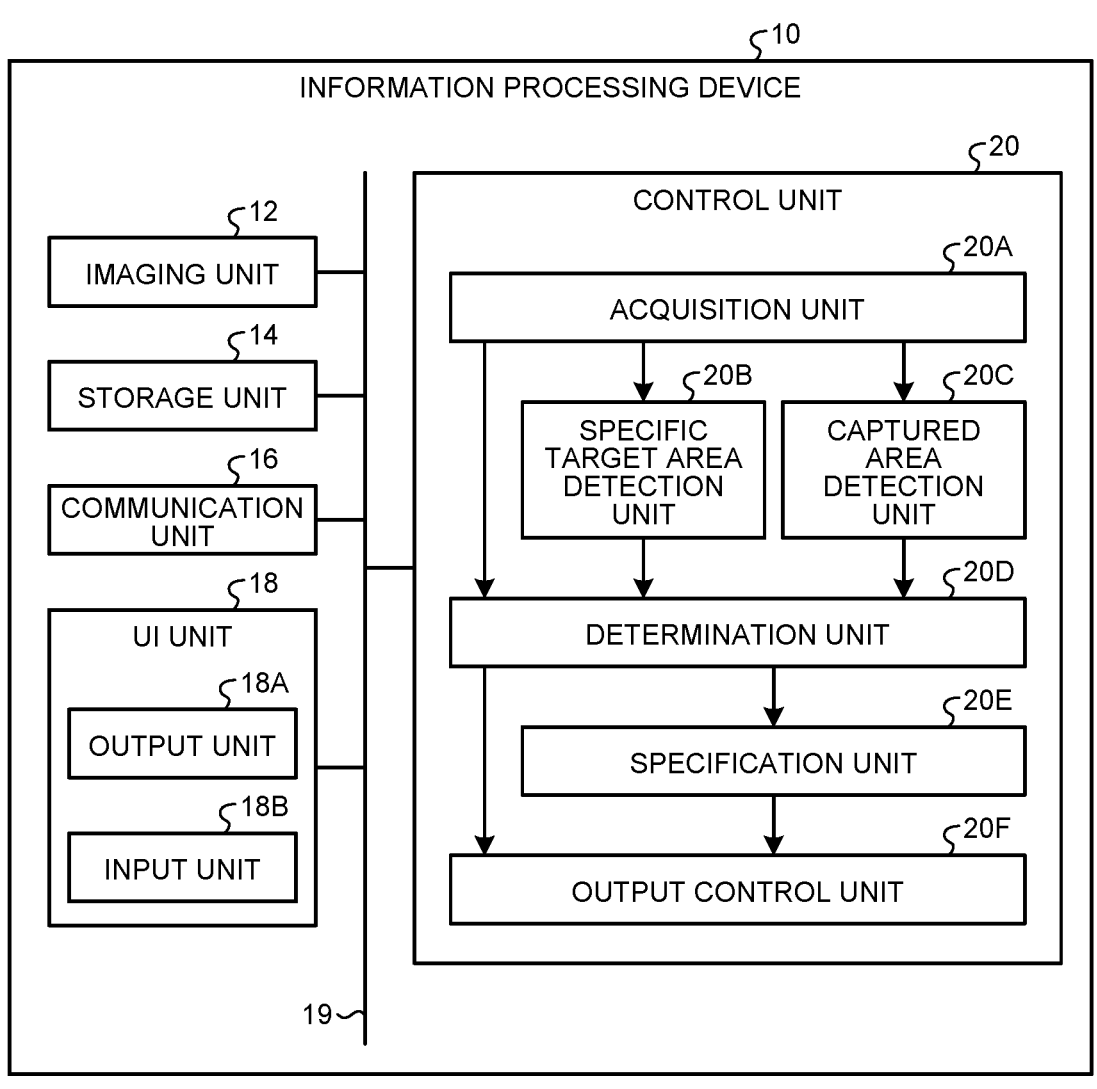
FIG. 1 is a block diagram illustrating a configuration of an information processing system.

FIG. 1 is a block diagram illustrating an example of a configuration of an information processing system 1 of the present embodiment.

The information processing system 1 includes an information processing device 10.

The information processing device 10 is an information processing device for assisting in imaging of a specific target. The details of the specific target will be described below.

The information processing device 10 includes an imaging unit 12, a storage unit 14, a communication unit 16, a user interface (UI) unit 18, and a control unit 20. The imaging unit 12, the storage unit 14, the communication unit 16, the UI unit 18, and the control unit 20 are communicatively connected via a bus 19 and the like.

The imaging unit 12 acquires taken image data by taking images. In the following, the taken image data will be referred to as a taken image. The storage unit 14 stores various types of information.

The communication unit 16 is a communication interface for communicating with an information processing device outside of the information processing device 10. For example, the communication unit 16 communicates with an external information processing device and an electronic device via a wired network such as Ethernet (registered trademark), a wireless network such as Wireless Fidelity (Wi-Fi) and Bluetooth (registered trademark), or the like.

The UI unit 18 includes an output unit 18A and an input unit 18B.

The output unit 18A outputs various types of information. For example, the output unit 18A is a display unit that is a display, a speaker, a projection device, and the like. The input unit 18B receives an operation instruction from the user. For example, the input unit 18B is a pointing device such as a mouse and a touchpad, a keyboard, and the like. The UI unit 18 may be a touch panel in which the output unit 18A and the input unit 18B are integrally configured.

The control unit 20 performs information processing in the information processing device 10. The control unit 20 includes an acquisition unit 20A, a specific target area detection unit 20B, a captured area detection unit 20C, a determination unit 20D, a specification unit 20E, and an output control unit 20F.

For example, the acquisition unit 20A, the specific target area detection unit 20B, the captured area detection unit 20C, the determination unit 20D, the specification unit 20E, and the output control unit 20F are implemented by one or a plurality of processors. For example, each of the units described above may be implemented by causing a processor such as a central processing unit (CPU) to execute a computer program, that is, by software. Each of the units described above may be implemented by a processor such as a dedicated IC, that is, by hardware. Each of the units described above may be implemented by a combination of software and hardware. When a plurality of the processors are used, each of the processors may implement one of the units or may implement two or more of the units.

At least one of the units described above included in the control unit 20 may be installed in an external information processing device that is communicatively connected to the information processing device 10 via a network or the like. Moreover, at least one of the various types of information stored in the storage unit 14 may be stored in an external storage device that is communicatively connected to the information processing device 10 via a network or the like. Furthermore, at least one of the imaging unit 12, the storage unit 14, and the UI unit 18 may be installed in an external information processing device that is communicatively connected to the information processing device 10. In this case, the information processing system 1 may be a system including the components installed outside and the information processing device 10.

The acquisition unit 20A acquires a taken image to be processed. For example, the acquisition unit 20A acquires a taken image taken by the imaging unit 12 from the imaging unit 12. The acquisition unit 20A may acquire a taken image from the storage unit 14. Moreover, the acquisition unit 20A may acquire a taken image from an external information processing device connected to the information processing device 10 via the communication unit 16 and a network.

The specific target area detection unit 20B detects a specific target area as a specific target from a taken image. The specific target area detection unit 20B detects a specific target area from the taken image acquired by the acquisition unit 20A. To detect a specific target area means to detect the position, size, and range of the specific target area with respect to the taken image.

The specific target means a specific element included in the target.

The target is an object that is the target of the image taking assistance. The target may be living or non-living things. For example, the living things include persons, plants, animals such as dogs, cells, and the like. The non-living things include structures such as bridges and buildings, moving bodies such as automobiles, non-moving bodies, and the like. In the present embodiment, for example, an embodiment in which the target is a person will be described.

The specific target is at least a part of elements of the target. For example, if the target is a person, the specific target may be a part of the person or the whole body of the person. Specifically, if the target is a person, the specific target may be any of the head, the upper part of the body, the lower part of the body, the leg part, the whole body, and the like of the person. Moreover, for example, if the target is a bridge, the specific target may be the entire bridge, a pier that forms a part of the bridge, and the like. The specific target may be determined in advance according to the target to which the image taking assistance is applied, and the like. Moreover, the specific target may be changed as appropriate by an operation instruction from the user through the input unit 18B and the like. In the present embodiment, for example, an embodiment in which the specific target is the whole body of a person will be described.

The specific target area is an area including all of an area of a specific target that is captured in the taken image and an area of the specific target that is not capture in the taken image. In detail, the specific target area is an area including the entire specific target included in a virtual enlarged area that is obtained by enlarging the imaging range of the taken image.

It is assumed that the target is a person and the specific target is the whole body of the person. Moreover, it is assumed that a part of the whole body of the person is cut off from the taken image, and that a part of the whole body of the person is hidden by another object or the like in the taken image. In this case, the specific target area is an area including the whole body of the person including the cut-off area and the hidden area of the whole body of the person.

The specific target area may be any area including the specific target, and the shape thereof is not limited. For example, the specific target area is an area within the frame line along the contour of the specific target, an area within the frame line of a predetermined shape surrounding the specific target, and the like. The shape of the frame line surrounding the specific target is not limited. For example, the shape of the frame line representing the specific target area may be any one of a polygonal shape, a rectangular shape, an oval shape, a circular shape, and the like.

It is preferable that the specific target area is an area surrounded by a frame line at least circumscribed to a part of the specific target. For example, it is preferable that the specific target area is an area surrounded by a frame line at least a part of which is brought into contact with the contour of a person included in the taken image.

In the present embodiment, for example, an embodiment in which the specific target area is a rectangular area surrounding the whole body of a person serving as an example of a specific target and that is surrounded by a rectangular frame line at least circumscribed to a part of the contour of a person included in the taken image will be described. That is, in the present embodiment, for example, an embodiment in which the specific target area is represented by a rectangular area surrounded by a rectangular frame line that represents the position, size, and range of the specific target area with respect to the taken image will be described.

Figure 2A:
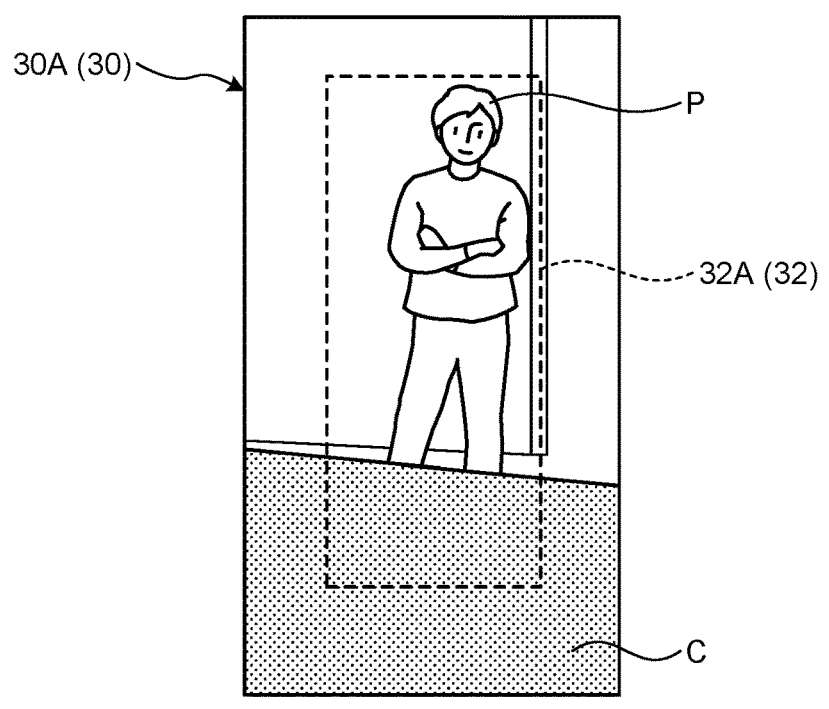
FIG. 2A is an explanatory view illustrating how a specific target area is detected.
Figure 2B:
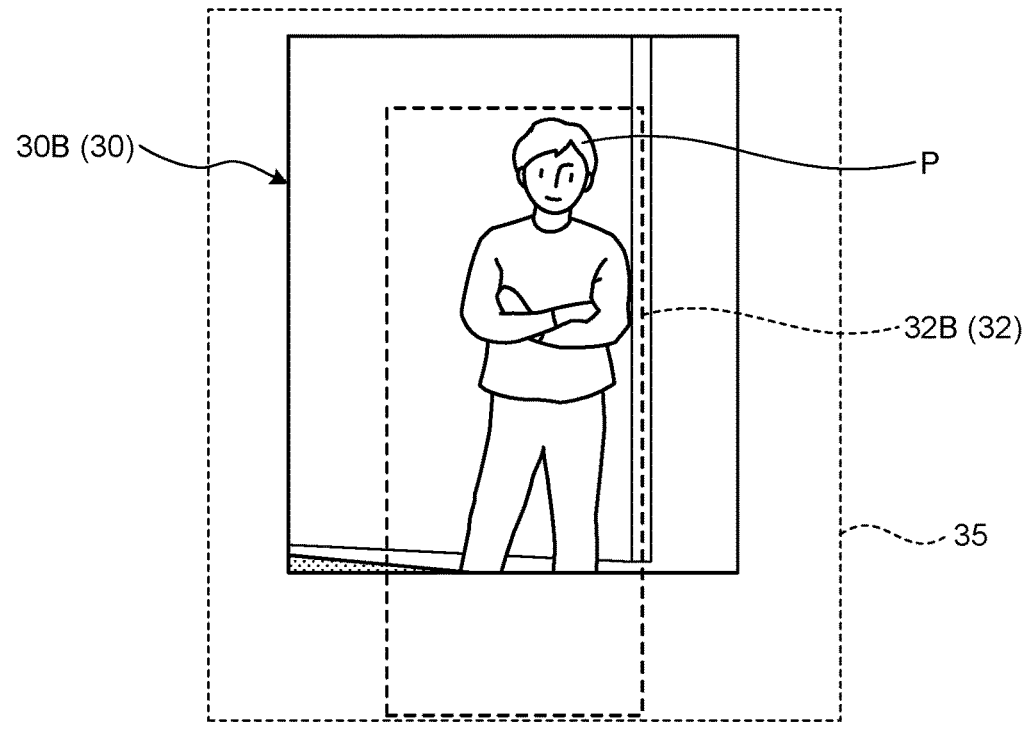
FIG. 2B is an explanatory view illustrating how a specific target area is detected.
Figure 2C:
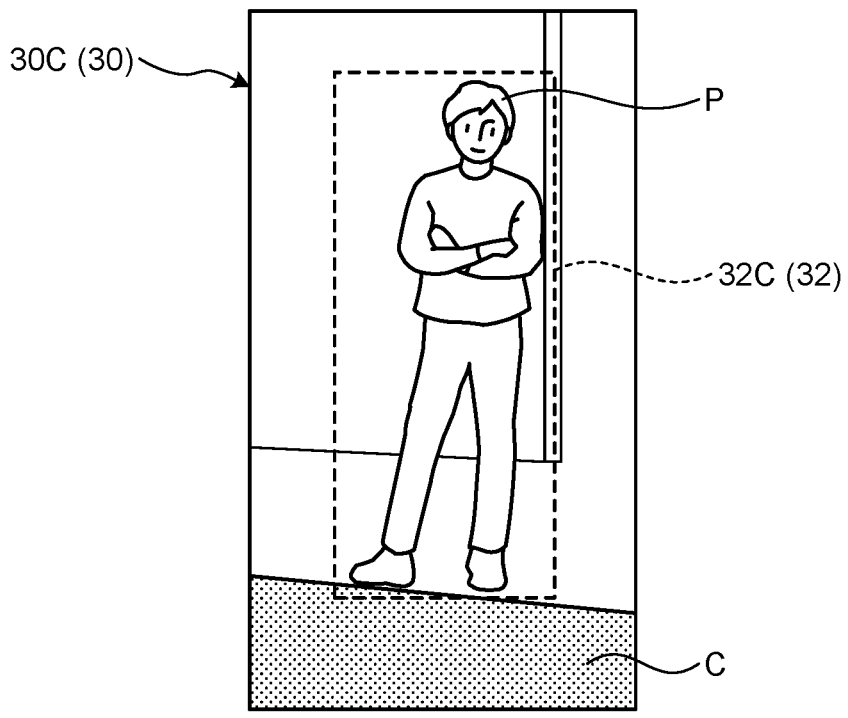
FIG. 2C is an explanatory view illustrating how a specific target area is detected.

FIG. 2A to FIG. 2C are each an explanatory view of an example illustrating how a specific target area 32 is detected.

FIG. 2A is an explanatory view of an example when the acquisition unit 20A has acquired a taken image 30A. The taken image 30A is an example of the taken image 30.

For example, it is assumed that, of the whole body of a person serving as an example of a specific target P, the acquisition unit 20A has acquired the taken image 30A in which the leg portion is hidden by an obstacle C. In this case, the specific target area detection unit 20B detects a rectangular area that includes a hidden area of the specific target P hidden by the obstacle C and that surrounds the whole body of the person serving as an example of the specific target P, from the taken image 30A as a specific target area 32A.

FIG. 2B is an explanatory view of an example when the acquisition unit 20A has acquired a taken image 30B. The taken image 30B is an example of the taken image 30.

For example, it is assumed that, of the whole body of a person serving as an example of the specific target P, the acquisition unit 20A has acquired the taken image 30B in which the leg portion is cut off from the taken image 30. In this case, the specific target area detection unit 20B detects a rectangular area included in a virtual enlarged area 35 that is obtained by enlarging the imaging range of the taken image 30B, that includes a cut-off area cut off from the taken image 30B, and that surrounds the whole body of a person serving as an example of the specific target P, from the taken image 30B as a specific target area 32B.

FIG. 2C is an explanatory view of an example when the acquisition unit 20A has acquired a taken image 30C. The taken image 30C is an example of the taken image 30.

For example, it is assumed that the whole body of a person serving as an example of the specific target P is captured in the taken image 30C, and the acquisition unit 20A has acquired the taken image 30C in which the whole body of the person is not hidden by the obstacle C or the like. In this case, the specific target area detection unit 20B detects a rectangular area surrounding the whole body of a person serving as an example of the specific target P, from the taken image 30C as a specific target area 32C.

With the processes described above, the specific target area detection unit 20B detects the specific target area 32 that is a rectangular area surrounded by a rectangular frame line that represents the position, size, and range of the specific target area 32 with respect to the taken image 30, from the taken image 30.

The explanation will be continued by returning to FIG. 1.

The specific target area detection unit 20B detects the specific target area 32 from the taken image 30 using a first learning model.

The first learning model used to detect the specific target area 32 is a model that inputs the taken image 30 and that outputs the specific target area 32. For example, the first learning model may be a machine learning model that outputs a rectangular area surrounding the whole body of a person serving as an example of the specific target P, as the specific target area 32 being the classification result of the taken image 30.

The first learning model used to detect the specific target area 32 may be learned in advance and stored in the storage unit 14. For example, the learning model used to detect the specific target area 32 may be a model using a known machine learning method such as a Convolution Neural Network (CNN), a semantic segmentation, a support vector machine (SVM), and the like.

For example, it is assumed that the learning model uses the machine learning method illustrated in Non-Patent Literature 1. Non-Patent Literature 1 discloses a method for learning a detector that outputs a desired rectangle, by performing learning using learning data composed of a plurality of pairs of learning images and correct rectangles. Moreover, in the general object detection process, when a rectangular area including an area protruded from the learning image is detected as an output rectangle, the output rectangle indicating the detection result is output after the area protruded from the output rectangle is clipped. Therefore, in the present embodiment, the first learning model that detects the specific target area 32 of the present embodiment from the taken image 30 may be learned in advance, by further learning not to perform the clipping process.

Non-Patent Literature 1: Ren, Shaoqing, Kaiming He, Ross Girshick, and Jian Sun. "Faster R-CNN: Towards Real-Time Object Detection with Region Proposal Networks." Advances in Neural Information Processing Systems. Vol. 28, 2015.

The specific target area detection unit 20B detects the specific target area 32 as an output from the first learning model, by inputting the taken image 30 acquired by the acquisition unit 20A into the first learning model used to detect the specific target area 32. That is, by inputting the taken image 30 into the first learning model, the specific target area detection unit 20B detects the information of a rectangular area that represents the position, size, and range of the rectangular area with respect to the taken image 30, as the specific target area 32.

The captured area detection unit 20C detects the captured area of the specific target P from the taken image 30. The captured area detection unit 20C detects the captured area from the taken image 30 acquired by the acquisition unit 20A. To detect a captured area means to detect the position, size, and range of the captured area with respect to the taken image 30.

The captured area represents an area of the specific target P captured in the taken image 30. In detail, the captured area represents an area of the specific target P not hidden by the obstacle C and the like in the taken image 30, that is, an area captured as an image in the taken image 30.

The captured area may be any area of the specific target P captured in the taken image 30, and the shape thereof is not limited. For example, the captured area is an area within a frame line along the contour of a portion of the specific target P captured in the taken image 30, an area within a frame line of a predetermined shape surrounding the portion of the specific target P captured in the taken image 30, and the like. The shape of the frame line surrounding the portion of the specific target P captured in the taken image 30 is not limited. For example, the shape of the frame line representing the captured area may be any one of a polygonal shape, a rectangular shape, an oval shape, a circular shape, and the like.

Moreover, the shape of the frame line representing the captured area may be the same as or different from the shape of the frame line representing the specific target area 32. In the present embodiment, for example, an embodiment in which the captured area is an area surrounded by a rectangular frame line surrounding the area of the specific target P captured in the taken image 30 will be described. That is, in the present embodiment, for example, an embodiment in which the captured area is represented by a rectangular area surrounded by a rectangular frame line that represents the position, size, and range of the captured area with respect to the taken image 30 will be described.

In the present embodiment, for example, an embodiment in which the shape of the frame line representing the captured area and the specific target area 32 is a rectangle will be described. It is apparent that at least one of the aspect ratio and size of the shape of the rectangular frame line representing the captured area and the specific target area 32 may differ according to the specific target P captured in the taken image 30.

Figure 3A:
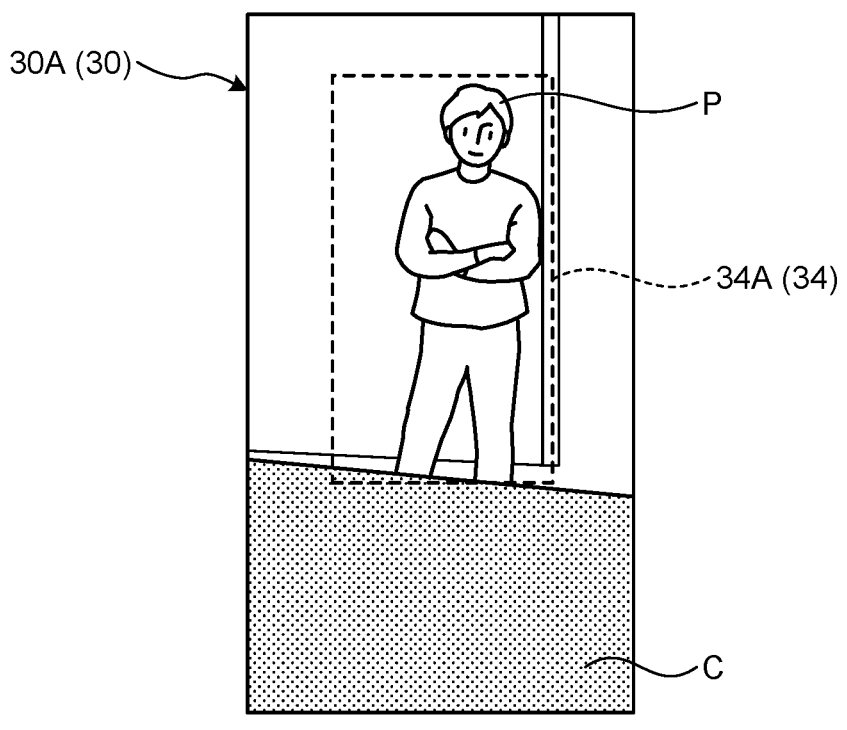
FIG. 3A is an explanatory view illustrating how a captured area is detected.
Figure 3B:
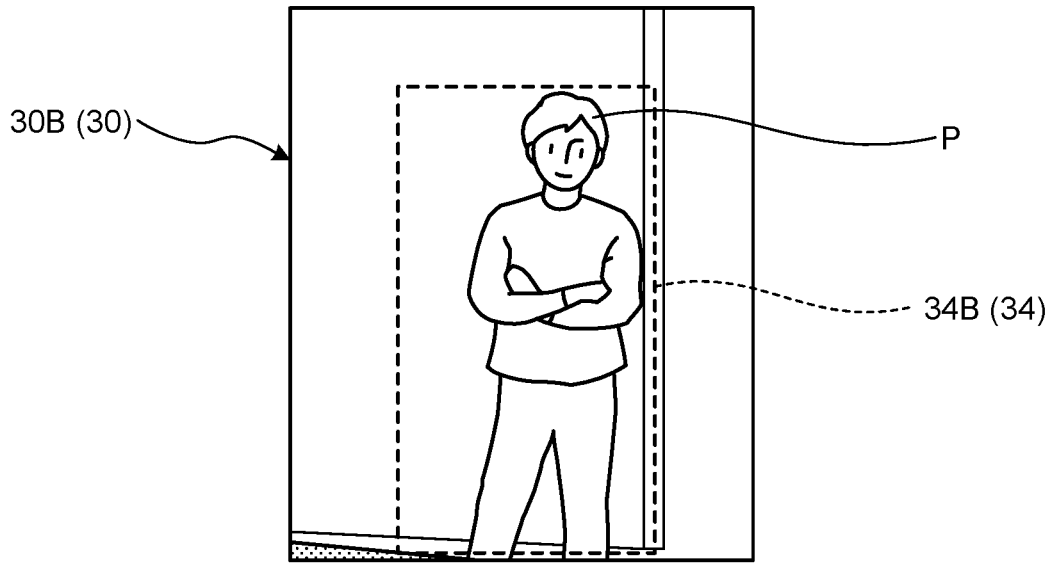
FIG. 3B is an explanatory view illustrating how a captured area is detected.
Figure 3C:
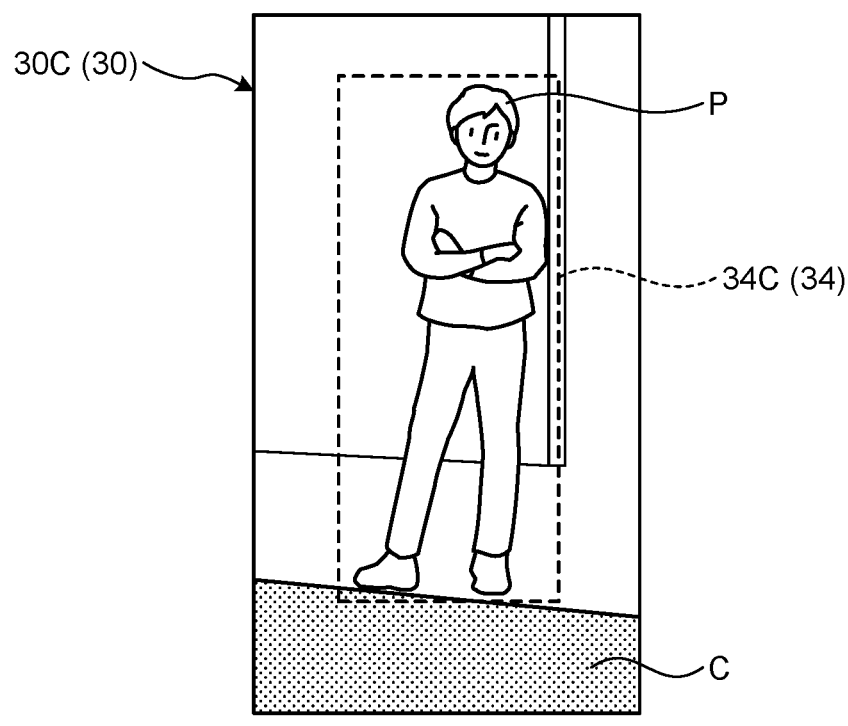
FIG. 3C is an explanatory view illustrating how a captured area is detected.

FIG. 3A to FIG. 3C are each an explanatory view of an example illustrating how the captured area 34 is detected.

FIG. 3A is an explanatory view of an example when the acquisition unit 20A has acquired a taken image 30A. The taken image 30A illustrated in FIG. 3A and FIG. 2A is an example of the same taken image 30.

For example, it is assumed that the acquisition unit 20A has acquired the taken image 30A. In this case, of the whole body of a person serving as an example of the specific target P, the captured area detection unit 20C detects an area captured in the taken image 30, that is, a rectangular area surrounding the area not hidden by the obstacle C in the taken image 30A, from the taken image 30A as a captured area 34A.

FIG. 3B is an explanatory view of an example when the acquisition unit 20A has acquired a taken image 30B. The taken image 30B illustrated in FIG. 3B and FIG. 2B is an example of the same taken image 30.

For example, it is assumed that the acquisition unit 20A has acquired the taken image 30B. In this case, of the whole body of a person serving as an example of the specific target P, the captured area detection unit 20C detects a rectangular area surrounding the area captured in the taken image 30, from the taken image 30B as a captured area 34B.

FIG. 3C is an explanatory view of an example when the acquisition unit 20A has acquired a taken image 30C. The taken image 30C illustrated in FIG. 3C and FIG. 2C is an example of the same taken image 30.

For example, it is assumed that the acquisition unit 20A has acquired the taken image 30C. In this case, of the whole body of a person serving as an example of the specific target P, the specific target area detection unit 20B detects a rectangular area surrounding the area captured in the taken image 30, from the taken image 30C as a captured area 34C.

With the processes described above, the captured area detection unit 20C detects the captured area 34 that is a rectangular area surrounded by a rectangular frame line that represents the position, size, and range of the captured area 34 with respect to the taken image 30, from the taken image 30.

The explanation will be continued by returning to FIG. 1. The captured area detection unit 20C detects the captured area 34 from the taken image 30 using a second learning model.

The second learning model used to detect the captured area 34 is a model that inputs the taken image 30 and that outputs the captured area 34. For example, the second learning model may be a machine learning model that outputs a rectangular area surrounding a portion of the specific target P captured in the taken image 30, as the captured area 34 being the classification result from the taken image 30.

The second learning model used to detect the captured area 34 may be learned in advance and stored in the storage unit 14. For example, the second learning model used to detect the captured area 34 may be a model using a known machine learning method such as a CNN, a semantic segmentation, an SVM, and the like. Specifically, for example, the second learning model may be a learning model using the machine learning method illustrated in Non-Patent Literature 1.

The captured area detection unit 20C detects the captured area 34 as an output from the second learning model, by inputting the taken image 30 acquired by the acquisition unit 20A into the second learning model used to detect the captured area 34. That is, by inputting the taken image 30 into the second learning model, the captured area detection unit 20C detects the information of a rectangular area that represents the position, size, and range of the rectangular area with respect to the taken image 30, as the captured area 34.

Next, the determination unit 20D will be described.

The determination unit 20D determines a non-captured area of the specific target P, on the basis of the specific target area 32 and the captured area 34.

The non-captured area represents an area of the specific target P not captured in the taken image 30. In detail, the non-captured area is an area that includes at least one of a hidden area of the specific target P that is hidden by the obstacle C or the like in the taken image 30, and a cut-off area of the specific target P that is cut off from the taken image 30.

The hidden area means an area of the specific target P not captured in the taken image 30 because the area is hidden by another object such as the obstacle C in the taken image 30. In other words, the hidden area is an area of the specific target P that is present within the imaging angle of view of the taken image 30, but is in the blind spot of the imaging unit 12 by another object such as the obstacle C.

For example, it is assumed that the acquisition unit 20A has acquired the taken image 30A (see FIG. 2A and FIG. 3A). As illustrated in FIG. 2A and FIG. 3A, the taken image 30A is the taken image 30 in which, of the whole body of a person serving as an example of the specific target P, the leg portion is hidden by the obstacle C. In this case, the area of the specific target P hidden by the obstacle C in the taken image 30A corresponds to the hidden area. In the case of the taken image 30A illustrated in FIG. 2A and FIG. 3A, of the whole body of a person serving as an example of the specific target P, an area of a part of the leg that is the area hidden by the obstacle C, corresponds to the hidden area.

The cut-off area means an area cut off from the taken image 30 in the specific target P. In other words, the cut-off area means an area of the specific target P outside the imaging angle of view of the taken image 30. That is, the cut-off area is an area of the specific target P not within the angle of view, that is outside the imaging angle of view of the taken image 30.

For example, it is assumed that the acquisition unit 20A has acquired the taken image 30B (see FIG. 2B and FIG. 3B). As illustrated in FIG. 2B and FIG. 3B, the taken image 30B is the taken image 30 in which, of the whole body of a person serving as an example of the specific target P, the leg portion is cut off from the taken image 30. In this case, the area of the specific target P cut off from the taken image 30B corresponds to the cut-off area. In the case of the taken image 30B illustrated in FIG. 2B and FIG. 3B, of the whole body of a person serving as an example of the specific target P, an area of a part of the leg that is the area cut off from the taken image 30B corresponds to the cut-off area.

On the basis of the specific target area 32 and the captured area 34, the determination unit 20D determines the non-captured area that includes at least one of the hidden area of the specific target P included in the taken image 30 and the cut-off area of the specific target P cut off from the taken image 30. The determination unit 20D determines the non-captured area that includes at least one of the hidden area and the cut-off area, using the taken image 30, the specific target area 32 detected from the taken image 30, and the captured area 34 detected from the taken image 30.

In detail, the determination unit 20D compares the specific target area 32 detected by the specific target area detection unit 20B with the captured area 34 detected by the captured area detection unit 20C. When there is a non-overlapping area of the specific target area 32 and the captured area 34 within the taken image 30, the determination unit 20D determines that there is a hidden area in the taken image 30. Then, the determination unit determines that the non-overlapping area of the specific target area 32 and the captured area 34 in the taken image 30, as the hidden area.

Figure 4A:
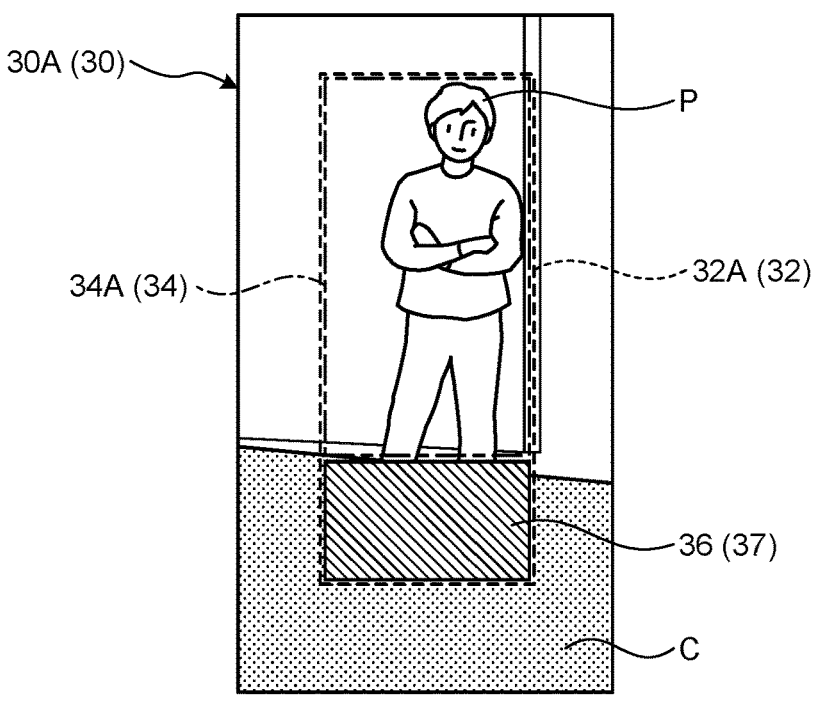
FIG. 4A is an explanatory view illustrating how a hidden area is determined.

FIG. 4A is an explanatory view of an example illustrating how a hidden area 36 is determined. For example, it is assumed that the acquisition unit 20A has acquired the taken image 30A. The taken image 30A illustrated in FIG. 4A, FIG. 2A, and FIG. 3A is an example of the same taken image 30. Then, it is assumed that the specific target area detection unit 20B has specified the specific target area 32A from the taken image 30A, and the captured area detection unit 20C has specified the captured area 34A from the taken image 30A.

In this case, the determination unit 20D compares the specific target area 32A with the captured area 34A, and determines whether there is a non-overlapping area between the specific target area 32A and the captured area 34A in the taken image 30A. That is, the determination unit 20D determines whether there is a difference between the position, size, and range represented by the specific target area 32A and the position, size, and range represented by the captured area 34A. Then, when there is a non-overlapping area between the specific target area 32A and the captured area 34A, the determination unit 20D judges that there is a hidden area, and determines the non-overlapping area as the hidden area 36.

Moreover, the determination unit 20D compares the taken image 30 with the specific target area 32 detected by the specific target area detection unit 20B. The determination unit 20D determines whether the specific target area 32 includes a non-overlapping area that does not overlap with the taken image 30. If the specific target area 32 includes a non-overlapping area that does not overlap with the taken image 30, the determination unit 20D determines that there is a cut-off area in the taken image 30. Then, the determination unit 20D determines that the non-overlapping area, which does not overlap with the taken image 30 within the specific target area 32, as the cut-off area.

Figure 4B:
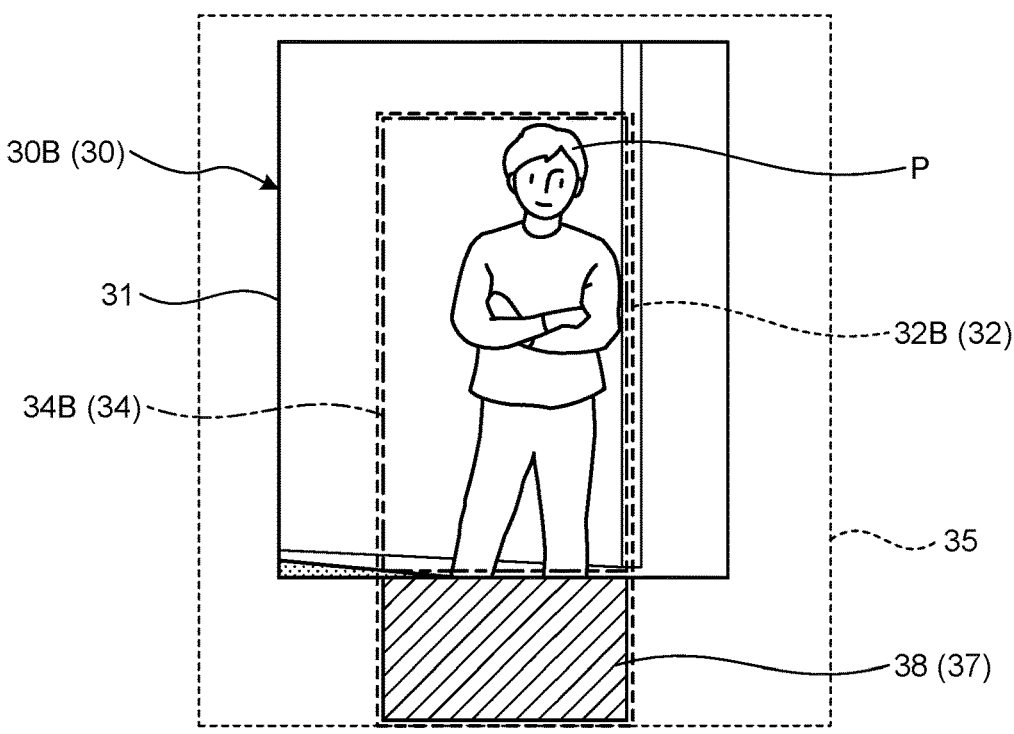
FIG. 4B is an explanatory view illustrating how a cut-off area is determined.

FIG. 4B is an explanatory view of an example illustrating how a cut-off area 38 is determined. For example, it is assumed that the acquisition unit 20A has acquired the taken image 30B. The taken image 30B illustrated in FIG. 4B, FIG. 2B, and FIG. 3B is an example of the same taken image 30. Then, it is assumed that the specific target area detection unit 20B has specified the specific target area 32B from the taken image 30B, and the captured area detection unit 20C has specified the captured area 34B from the taken image 30B.

In this case, the determination unit 20D compares the taken image 30B with the specific target area 32, and determines whether the specific target area 32B includes a non-overlapping area that does not overlap with the taken image 30B. That is, the determination unit 20D determines whether at least a part of the specific target area 32B is present outside an image frame 31 of the taken image 30B. Then, when the specific target area 32B includes a non-overlapping area that does not overlap with the taken image the determination unit 20D judges that the cut-off area 38 is present, and determines the non-overlapping area as the cut-off area 38. That is, the determination unit determines the area located outside the image frame 31 of the taken image 30B within the specific target area 32B, as the cut-off area 38.

With the processes described above, the determination unit 20D determines that at least one of the hidden area 36 and the cut-off area 38 is a non-captured area 37, using the taken image 30, the specific target area 32, and the captured area 34.

The explanation will be continued by returning to FIG. 1.

The specification unit 20E specifies the recommended imaging environment in which the non-captured area 37 determined by the determination unit 20D is captured in the taken image 30.

In detail, the specification unit 20E specifies at least one of the recommended imaging angle of view with which the cut-off area 38 is captured, and the recommended imaging direction with which the hidden area 36 is captured, as the recommended imaging environment.

The specification unit 20E judges whether the cut-off area 38 is determined as the non-captured area 37 by the determination unit 20D. When the cut-off area 38 is determined as the non-captured area 37, the specification unit 20E specifies the frame at which at least one of an enlargement process, a deformation process, and a moving process is performed on the image frame 31 of the taken image 30 such that the imaging angle of view includes the entire specific target area 32 determined to include the cut-off area 38, as the recommended imaging angle of view.

The specification unit 20E may specify the recommended imaging angle of view, according to the function of the imaging unit 12, which picks up the taken image 30. For example, it is assumed that the imaging unit 12 has a zoom function. In this case, the specification unit 20E may specify the frame at which the image frame 31 of the taken image 30 is enlarged such that the imaging angle of view includes the entire specific target area 32 determined to include the cut-off area 38, as the recommended imaging angle of view.

For example, the specification unit 20E associates the identification information of the imaging unit 12 with the function information representing the function of the imaging unit 12, and stores the associated information in the storage unit 14 in advance. Then, during the specification of the recommended imaging angle of view, the specification unit 20E may read out the function information corresponding to the identification information of the imaging unit 12 to be identified, and specify the recommended imaging angle of view.

Moreover, the specification unit 20E judges whether the hidden area 36 is determined as the non-captured area 37 by the determination unit 20D. When the hidden area 36 is determined as the non-captured area 37, the specification unit 20E specifies the imaging direction with which the hidden area 36 included in the specific target P is captured in the taken image 30, as the recommended imaging direction.

For example, when the hidden area 36 is determined as the non-captured area 37, the specification unit 20E specifies the direction shifted by a predetermined imaging angle from the current imaging direction, as the recommended imaging direction. For example, the predetermined imaging angle is 30°, 60°, 90°, or the like, but the value is not limited thereto. The predetermined imaging angle may be changed as appropriate by an operation instruction from the user through the input unit 18B and the like. Moreover, the specification unit 20E may learn in advance a learning model that inputs at least one of the taken image 30, the hidden area 36, and the specific target area 32, and that outputs a recommended imaging direction, and specify the recommended imaging direction by using the learning model.

Next, the output control unit 20F will be described.

The output control unit 20F outputs the determination result information according to the determination result of the determination unit 20D to the output unit 18A. The output control unit 20F outputs at least one of a sound and an image representing the determination result information, to the output unit 18A.

For example, the output control unit 20F outputs the determination result information representing at least one of the non-captured area 37 determined by the determination unit 20D, the specific target area 32 detected by the specific target area detection unit 20B, the captured area 34 detected by the captured area detection unit 20C, the recommended imaging environment specified by the specification unit 20E, and a warning indicating that the non-captured area 37 is included in the taken image 30, to the output unit 18A.

Specifically, the output control unit 20F displays a display screen including the determination result information on the display unit included in the output unit 18A.

Figure 5:
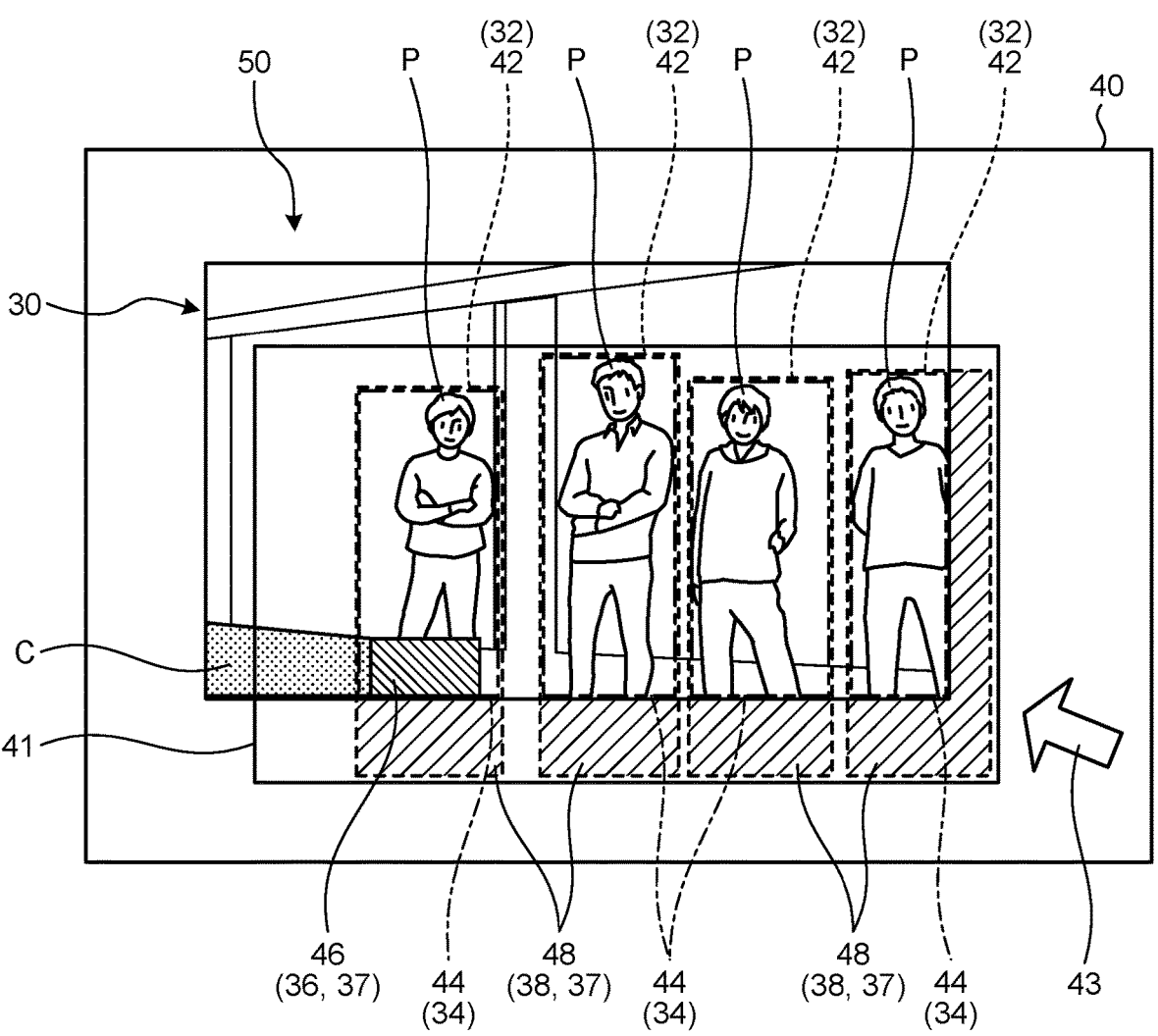
FIG. 5 is a schematic diagram of an example of a display screen.

FIG. 5 is a schematic diagram of an example of a display screen 40. The display screen 40 is a display screen including the determination result information, and is an example of a display screen to be displayed on the display unit included in the output unit 18A.

For example, the output control unit 20F outputs the display screen 40 including a superimposed image 50 in which an image representing the determination result information is superimposed on the taken image 30, to the output unit 18A.

In detail, the output control unit 20F creates the superimposed image 50 in which at least one of an image 42 representing the specific target area 32, an image 44 representing the captured area 34, an image 46 representing the hidden area 36, and an image 48 representing the cut-off area 38 is superimposed on the taken image 30. Moreover, the output control unit 20F may further create at least one of an image 41 representing the recommended imaging angle of view and an image 43 representing the recommended imaging direction. Then, the output control unit 20F displays the superimposed image 50 and the superimposed image 50 that includes at least one of the image 41 representing the recommended imaging angle of view and the image 43 representing the recommended imaging direction, on the display unit included in the output unit 18A.

The display mode of the image 41, image 43, image 42, image 44, image 46, and image 48 described above generated by the output control unit 20F is not limited to the example illustrated in FIG. 5. For example, as illustrated in FIG. 5, as an image representing each area of the specific target area 32, the captured area 34, the hidden area 36, and the cut-off area 38, the output control unit 20F may use an image representing the outer frame of the areas described above. Moreover, the output control unit 20F may use an image in which the inside of each area is filled, as the image representing each of the areas described above.

The output control unit 20F may generate the superimposed image 50 in which at least one of the image 41 representing the recommended imaging angle of view and the image 43 representing the recommended imaging direction is further superimposed on the taken image 30, and display the generated superimposed image 50 on the display unit, which is the output unit 18A.

Moreover, when the specific target area 32 includes the non-captured area 37 that is at least one of the hidden area 36 and the cut-off area 38, the output control unit 20F may display the display screen 40 that further includes an image of a warning indicating that the non-captured area 37 is included, on the display unit, which is the output unit 18A.

Furthermore, the output control unit 20F may output a sound indicating the warning described above, from a speaker included in the output unit 18A.

By outputting the determination result information to the output unit 18A, the output control unit 20F can provide information for adjusting the imaging environment so that the specific target area 32 is captured in the taken image 30.

Next, an example of a flow of information processing performed by the information processing device 10 of the present embodiment will be described.

Figure 6:
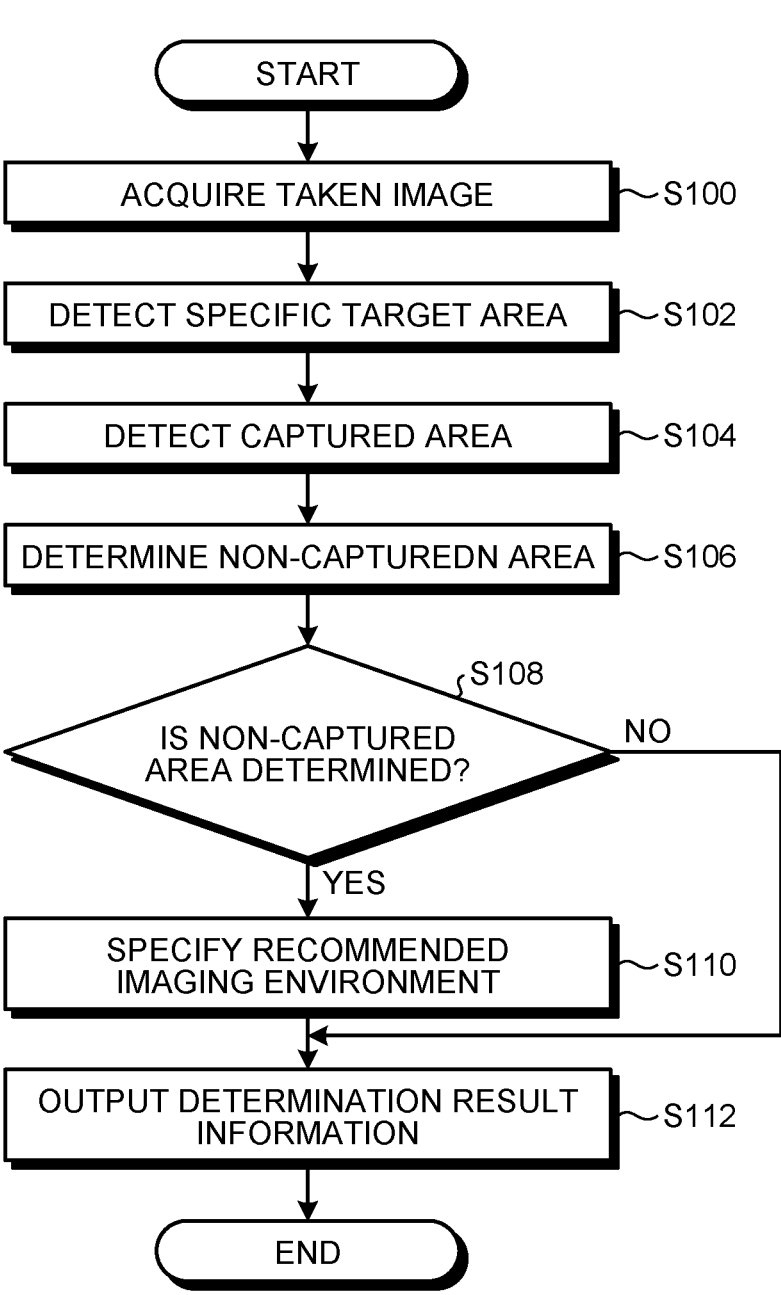
FIG. 6 is a flowchart illustrating a flow of information processing.

FIG. 6 is a flowchart illustrating an example of a flow of information processing performed by the information processing device 10 of the present embodiment.

The acquisition unit 20A acquires the taken image 30 (step S100).

The specific target area detection unit 20B detects the specific target area 32 from the taken image 30 acquired at step S100 (step S102). The captured area detection unit 20C detects the captured area 34 from the taken image 30 acquired at step S100 (step S104).

The determination unit 20D determines the non-captured area 37 of the specific target P, on the basis of the specific target area 32 detected at step S102 and the captured area 34 detected at step S104 (step S106). The determination unit 20D determines the non-captured area 37 that includes at least one of the hidden area 36 and the cut-off area 38.

Next, the determination unit 20D judges whether the non-captured area 37 is determined at step S106 (step S108). If it is not possible to determine the non-captured area 37 (No at step S108), the process proceeds to step S112, which will be described below. If it is possible to determine the non-captured area 37 (Yes at step S108), the process proceeds to step S110.

At step S110, the specification unit 20E specifies the recommended imaging environment in which the non-captured area 37 is captured in the taken image 30, on the basis of the taken image 30 acquired at step S100 and the non-captured area 37 determined at step S106 (step S110).

The output control unit 20F outputs the determination result information according to the determination result obtained at step S106 to the output unit 18A (step S112). The output control unit 20F outputs the determination result information representing at least one of the non-captured area 37 determined at step S108, the specific target area 32 detected at step S102, the captured area 34 detected at step S104, the recommended imaging environment specified at step S110, and a warning indicating that the non-captured area 37 is included in the taken image 30, to the output unit 18A. Then, the present routine is terminated.

As described above, the information processing device 10 of the present embodiment includes the specific target area detection unit 20B, the captured area detection unit 20C, and the determination unit 20D. The specific target area detection unit 20B detects the specific target area 32 of the specific target P from the taken image 30. The captured area detection unit 20C detects the captured area 34 of the specific target P from the taken image 30. The determination unit 20D determines the non-captured area 37 of the specific target P, on the basis of the specific target area 32 and the captured area 34.

In the conventional technique, a technique for detecting a part of an object included in the taken image 30, and distinguishing the presence of an undetected part among a plurality of the parts that form the object has been disclosed. However, the conventional technique can merely distinguish the presence of an undetected part, and cannot specify an area of the undetected part with respect to the taken image 30. Therefore, the conventional technique cannot provide information capable of adjusting the imaging environment so that the entire specific target area 32 of a specific part and the like of the object is captured. That is, with the conventional technique, it has been difficult to assist in imaging of the specific target P.

On the other hand, with the information processing device 10 of the present embodiment, the specific target area detection unit 20B detects the specific target area 32, and the captured area detection unit 20C detects the captured area 34. The determination unit 20D determines the non-captured area 37 of the specific target P, on the basis of the specific target area 32 and the captured area 34 of the specific target P detected from the taken image 30.

In this manner, the information processing device 10 of the present embodiment determines the non-captured area 37 of the specific target P not captured in the taken image 30, instead of merely detecting the presence of a specific part.

Therefore, by providing the information representing the non-captured area 37 determined by the determination unit 20D, the information processing device 10 of the present embodiment can provide information for adjusting the imaging environment so that the non-captured area 37 is captured in the taken image 30. That is, the information processing device 10 of the present embodiment can provide information for adjusting the imaging environment so that the entire specific target P including the non-captured area 37 is captured in the taken image 30.

Thus, the information processing device 10 of the present embodiment can assist in imaging of the specific target P.

Moreover, in the conventional technique, the specific target P is limited to persons and automobiles composed of a plurality of parts, and it has been difficult to apply the conventional technique to the specific target P that is difficult to be represented by dividing into a plurality of parts. Moreover, in the conventional technique, the detection process needs to be performed on each of the parts, and there has been problems of processing load and processing cost in some cases.

On the other hand, regardless of whether the specific target P is composed of one or a plurality of parts, the information processing device 10 of the present embodiment detects the specific target area 32 and the captured area 34 of the specific target P from the taken image 30, and determines the non-captured area 37 of the specific target P on the basis of the specific target area 32 and the captured area 34.

Therefore, in addition to the effects described above, the information processing device 10 of the present embodiment can reduce the processing load and processing cost.

Moreover, the information processing device 10 of the present embodiment determines the non-captured area 37 of the specific target P, by detecting the specific target area 32 and the captured area 34 from the taken image 30. Therefore, in addition to the effects described above, the information processing device 10 of the present embodiment is applicable to various specific targets P in addition to persons and automobiles.

Furthermore, the information processing device 10 of the present embodiment includes the output control unit 20F. The output control unit 20F outputs the determination result information according to the determination result of the determination unit 20D to the output unit 18A.

Therefore, for example, by checking the determination result information output to the output unit 18A, the user can easily adjust the installation environment and the like of the imaging unit 12 so that the imaging environment such as the imaging angle of view and imaging direction, becomes a desired imaging environment. That is, by checking the determination result information, the user can easily adjust the imaging environment such as the installation environment of the imaging unit 12 such that the imaging direction and the imaging angle of view with which the entire specific target P are established are reached.

Therefore, in addition to the effects described above, the information processing device 10 of the present embodiment can reduce the workload of adjusting the imaging unit 12.

In the embodiment described above, for example, an embodiment in which the imaging unit 12 is provided in the information processing device 10 is described. However, as described above, the imaging unit 12 may be installed on an external information processing device that is communicatively connected to the information processing device 10 via the communication unit 16.

For example, the external information processing device on which the imaging unit 12 is installed includes a surveillance camera installed on a building or the like, a flying object such as a drone, an unmanned vehicle on which the imaging unit 12 is installed, a moving body on which the imaging unit 12 is installed, and the like. However, it is not limited thereto.

Moreover, in the embodiment described above, for example, an embodiment in which the output control unit 20F outputs the determination result information to the UI unit 18 is described. However, the output control unit 20F may output the determination result information to an external information processing device via the communication unit 16.

For example, the output control unit 20F may output the determination result information to an information processing device on which the imaging unit 12 is installed via the communication unit 16. In this case, the control unit of the information processing device may use the determination result information received from the information processing device 10, and control a driving unit such as a motor for adjusting the imaging direction and the imaging angle of view of the imaging unit 12 such that the imaging direction and the imaging angle of view with which the entire specific target P is captured are established.

Next, an example of a hardware configuration of the information processing device 10 of the above embodiment will be described.

Figure 7:
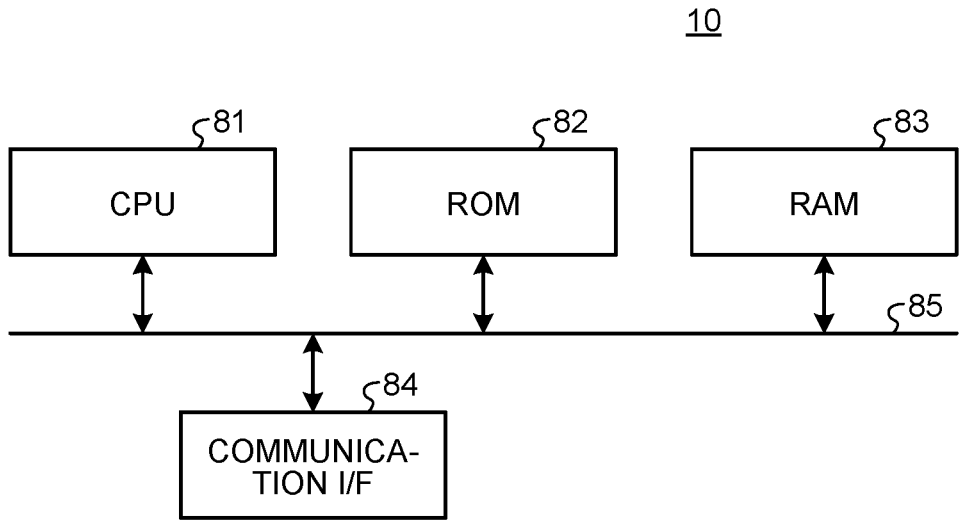
FIG. 7 is a diagram illustrating a hardware configuration.

FIG. 7 is a diagram illustrating a hardware configuration of an example of the information processing device 10 of the above embodiment.

The information processing device 10 of the above embodiment includes a CPU 81, a read only memory (ROM) 82, a random access memory (RAM) 83, a communication I/F 84, and the like connected to each other via a bus 85, and has a hardware configuration using a normal computer.

The CPU 81 is an arithmetic device that controls the information processing device 10 of the above embodiment. The ROM 82 stores computer programs and the like that implement various processes by the CPU 81. Here, an example using a CPU is described. However, the arithmetic device that controls the information processing device 10 may be a graphics processing unit (GPU). The RAM 83 stores data necessary for various processes by the CPU 81. The communication I/F 84 is an interface connected to the UI unit 18 and the like, and transmits and receives data.

In the information processing device 10 of the above embodiment, each of the functions described above is implemented on a computer, by allowing the CPU 81 to read out a computer program from the ROM 82 to the RAM 83 and execute the computer program.

The computer program for executing the processes described above performed by the information processing device 10 of the above embodiment may be stored in a hard disk drive (HDD). Moreover, the computer program for executing the processes described above performed by the information processing device 10 of the above embodiment may be provided by being incorporated in the ROM 82 in advance.

Furthermore, the computer program for executing the processes described above to be executed by the information processing device 10 of the above embodiment may be provided as a computer program product by being stored in a computer readable storage media such as a compact disc-read only memory (CD-ROM), a compact disc-recordable (CD-R), a memory card, a digital versatile disc (DVD), and a flexible disk (FD) in an installable or executable file format. Still furthermore, the computer program for executing the processes described above to be executed by the information processing device 10 of the above embodiment may be stored in a computer connected to a network such as the Internet, and provided by being downloaded through the network. Still furthermore, the computer program for executing the processes described above to be executed by the information processing device 10 of the above embodiment may be provided or distributed via a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
processing circuitry configured to
    detect a specific target area of a specific target from a taken image, the specific target area being an area including a whole of the specific target, included in a virtual enlarged area that is obtained by enlarging an imaging range of the taken image;
    detect a captured area of the specific target from the taken image; and
    determine a non-captured area of the specific target, based on the specific target area and the captured area, wherein
the processing circuitry is configured to generate a superimposed image in which an image representing the specific target area, an image representing the captured area, an image representing a hidden area of the specific target included in the taken image, and an image representing a cut-off area of the specific target cut off from the taken image are superimposed on the taken image.

2. The device according to claim 1, wherein the processing circuitry is configured to determine the non-captured area that includes at least one of the hidden area of the specific target included in the taken image and the cut-off area of the specific target cut off from the taken image, based on the specific target area and the captured area.

3. The device according to claim 2, wherein the processing circuitry is configured to specify a recommended imaging environment in which the non-captured area is captured in the taken image.

4. The device according to claim 3, wherein the processing circuitry is configured to specify at least one of a recommended imaging angle of view with which the cut-off area is captured, and a recommended imaging direction with which the hidden area is captured, as the recommended imaging environment.

5. The device according to claim 1, wherein the processing circuitry is configured to output determination result information according to a determination result of the determination of the non-captured area of the specific target.

6. The device according to claim 5, wherein the processing circuitry is configured to output at least one of a sound and an image representing the determination result information.

7. The device according to claim 5, wherein the processing circuitry is configured to output the determination result information representing at least one of the non-captured area, the specific target area, the captured area, a recommended imaging environment, and a warning indicating that the non-captured area is included in the taken image.

8. The device according to claim 5, wherein the processing circuitry is configured to output the superimposed image to a display.

9. An information processing method comprising:
detecting a specific target area of a specific target from a taken image, the specific target area being an area including a whole of the specific target, included in a virtual enlarged area that is obtained by enlarging an imaging range of the taken image;
detecting a captured area of the specific target from the taken image; and
determining a non-captured area of the specific target, based on the specific target area and the captured area, wherein
the method further comprises generating a superimposed image in which an image representing the specific target area, an image representing the captured area, an image representing a hidden area of the specific target included in the taken image, and an image representing a cut-off area of the specific target cut off from the taken image are superimposed on the taken image.

10. A non-transitory computer-readable storage medium including computer executable instructions, wherein the instructions, when executed by a computer, cause the computer to perform a method, the method comprising:
detecting a specific target area of a specific target from a taken image, the specific target area being an area including a whole of the specific target, included in a virtual enlarged area that is obtained by enlarging an imaging range of the taken image;
detecting a captured area of the specific target from the taken image; and
determining a non-captured area of the specific target based on the specific target area and the captured area, wherein
the method further comprises generating a superimposed image in which an image representing the specific target area, an image representing the captured area, an image representing a hidden area of the specific target included in the taken image, and an image representing a cut-off area of the specific target cut off from the taken image are superimposed on the taken image.

11. The device according to claim 1, wherein the processing circuitry is configured to detect the captured area of the specific target from the taken image using a machine learning model.

\* \* \* \* \*